US012668024B2

(12) United States Patent
Pearlson

(10) Patent No.: US 12,668,024 B2
(45) Date of Patent: Jun. 30, 2026

(54) ADDITIVE MANUFACTURING USING FOAMING RADIATION-CURABLE RESIN

(71) Applicant: Igneous IP Holdings, LLC, Wales, WI (US)

(72) Inventor: Matthew Noah Pearlson, Wales, WI (US)

(73) Assignee: Intrnls, Inc., Wales, WI (US)

( * ) Notice: Subject to any disclaimer, the term of this patent is extended or adjusted under 35 U.S.C. 154(b) by 0 days.

(21) Appl. No.: 18/108,335

(22) Filed: Feb. 10, 2023

(65) Prior Publication Data

US 2023/0191701 A1 Jun. 22, 2023

Related U.S. Application Data

(63) Continuation of application No. 15/833,354, filed on Dec. 6, 2017, now Pat. No. 11,738,511.

(Continued)

(51) Int. Cl.
 *B29C 64/314* (2017.01)
 *B29C 44/02* (2006.01)
 (Continued)

(52) U.S. Cl.
 CPC .......... *B29C 64/314* (2017.08); *B29C 44/022* (2013.01); *B29C 64/135* (2017.08);
 (Continued)

(58) Field of Classification Search
 CPC .................................................. B29C 44/022
 See application file for complete search history.

(56) References Cited

U.S. PATENT DOCUMENTS

| 3,600,336 A | * | 8/1971 | Okada | ........................ C08J 9/06 |
| | | | | 521/184 |
| 5,182,715 A | * | 1/1993 | Vorgitch | ................ B33Y 10/00 |
| | | | | 264/401 |

(Continued)

FOREIGN PATENT DOCUMENTS

| CN | 103087839 A | * | 5/2013 | |
| EP | 1166987 A2 | * | 1/2002 | ........... B29C 41/003 |

(Continued)

OTHER PUBLICATIONS

Machine translation WO0192387A1 (Year: 2001).*

(Continued)

*Primary Examiner* — Jacob T Minskey
*Assistant Examiner* — Wayne K. Swier
(74) *Attorney, Agent, or Firm* — David H. Judson

(57) ABSTRACT

SLA-based additive manufacturing using radiation-curable foams enables the production by 3D printing of lightweight parts having desirable physical and functional attributes. A representative method of manufacturing such items includes processing a radiation-curable resin in liquid form to produce a stable, non-aqueous radiation-curable foam, on-demand deposition of the foam at a build layer of a build surface within a 3D printer, and then curing the non-aqueous radiation-curable foam to produce a layer of a 3D build item. Processing the resin typically includes agitation, mixing, shaking, gas injection, ultrasonic stimulation, or combinations thereof. 3D articles of manufacture made by the above-described manufacturing process are also provided.

7 Claims, 6 Drawing Sheets

Related U.S. Application Data

(60) Provisional application No. 62/431,543, filed on Dec. 8, 2016.

(51) Int. Cl.
| | | |
|---|---|---|
| *B29C 64/135* | (2017.01) | |
| *B29K 105/24* | (2006.01) | |
| *B33Y 10/00* | (2015.01) | |
| *B33Y 70/00* | (2020.01) | |
| *B33Y 80/00* | (2015.01) | |

(52) U.S. Cl.
CPC .............. *B33Y 10/00* (2014.12); *B33Y 70/00* (2014.12); *B33Y 80/00* (2014.12); *B29K 2105/24* (2013.01)

(56) References Cited

U.S. PATENT DOCUMENTS

| | | | | |
|---|---|---|---|---|
| 6,423,252 B1 * | 7/2002 | Chun | .................... | B29C 41/003 |
| | | | | 264/28 |
| 2016/0059485 A1 * | 3/2016 | Ding | .................... | B29C 64/314 |
| | | | | 264/401 |

FOREIGN PATENT DOCUMENTS

| | | | | | |
|---|---|---|---|---|---|
| EP | 3034281 A1 | * | 6/2016 | .............. | G03H 1/08 |
| WO | WO-0192387 A1 | * | 12/2001 | ............... | C08J 9/33 |
| WO | WO-0204188 A1 | * | 1/2002 | ......... | B29C 44/0461 |

OTHER PUBLICATIONS

Machine translation WO0204188A1 (Year: 2002).*

Advances in Colloid and Interface Science 165 (2011) 108-116 Kruiglyakov P. M, Elaneva S. I., Vilkova N. G. About mechanism of foam stabilization by solid particles (Year: 2011).*

Machine translation CN103087839A (Year: 2013).*

C. R. Physique 15(2014)748-760 Fameau, A L, Salonen A. Effect of particles and aggregated structures on the foam stability and aging (Year: 2014).*

Advances in Colloid and Interface Science 205 (2014) 74-86 Rio E, Drenckhan W., Salonen A. Langevin D. Unusually stable liquid foams. (Year: 2014).*

* cited by examiner

| TYPE | IMAGE | OBJECTIVE | 5 |
|---|---|---|---|
| MAGNIFICATION | 116x | PIXEL TO MICRON | 1.914 |
| FIELD OF VIEW | 3062 µm x 2297 µm | EXPOSURE TIME | 0.6203 ms |
| APERTURE | 0 | RESOLUTION | 1.9140 µm/PIXEL |

| TYPE | IMAGE | OBJECTIVE | 5 |
|---|---|---|---|
| MAGNIFICATION | 101x | PIXEL TO MICRON | 2.2011 |
| FIELD OF VIEW | 3522 µm x 2641 µm | EXPOSURE TIME | 0.201 ms |
| APERTURE | 0 | RESOLUTION | 2.2011 µm/PIXEL |

| TYPE | IMAGE | OBJECTIVE | 5 |
|---|---|---|---|
| MAGNIFICATION | 280x | PIXEL TO MICRON | 0.7946 |
| FIELD OF VIEW | 1271 µm x 954 µm | EXPOSURE TIME | 7.3367 ms |
| APERTURE | 0 | RESOLUTION | 0.7946 µm/PIXEL |

ADDITIVE MANUFACTURING USING FOAMING RADIATION-CURABLE RESIN

BACKGROUND

Technical Field

This application relates generally to additive manufacturing techniques.

Brief Description of the Related Art

Stereolithography (SLA) is a form of three-dimensional (3D) printing technology used for creating models, prototypes, patterns and production parts in a layer by layer fashion (so-called "additive manufacturing") using photopolymerization, a process by which light causes chains of molecules to link, forming polymers. Those polymers then make up the body of a three-dimensional solid. Typically, an SLA additive manufacturing process uses a build platform having a build tray submerged in a liquid photosensitive material. A 3D model of the item to be manufactured is imported into an associated 3D printer software, which software slices the 3D model into 2D images that are then projected onto the build platform to expose the photopolymer.

SLA additive manufacturing has the potential to revolutionize the manufacturing industry. Its high resolution and broad range of chemistries allow the production of complex shapes and structures with a variety of characteristics that range from rigid to very flexible, high temperature-stable, and investment casting resins. Further, while these techniques have proven to produce satisfactory results, they have certain limitations that have prevented their widespread use for general manufacturing. Foremost, additive manufacturing technologies are slow and only produce small parts. As a result, they are used predominately for prototyping parts and not manufacturing. In particular, slow production speeds, which are by a plurality of technical limitations, make SLA additive manufacturing suitable only for rapid prototyping (or small quantity production at best), and it produces parts that are of a sub-meter scale in size. These issues currently prevent SLA from disrupting traditional manufacturing beyond rapid prototyping.

In particular, current SLA build volumes typically are less than twelve square inches. One approach to address this limitation is described, for example, in U.S. Publication No. 2017/0100885, assigned to Carbon, Inc. d/b/a Carbon3D, which publication describes the use of a plurality of tiled projectors for making larger build volumes, e.g., up to five (5) square meters, in part by what the publication describes as (i) continuously maintaining a dead zone of polymerizable liquid in contact with a build surface, and (ii) continuously maintaining a gradient of polymerization zone (an active surface on the bottom of a growing three dimensional object) between the dead zone and the solid polymer and in contact with each thereof, the gradient of polymerization zone comprising the polymerizable liquid in partially cured form. This technique (e.g., exploiting the oxygen permeable deadzone with hyper-oxygen-permeable amophous teflon coatings), however, lacks commercial feasibility. In particular, the cost of such materials is approximately $5,000 per square foot. Therefore, a five meter square (54 square foot) build plate would require $270,000 of amorphous teflon. While not out of scope for some industrial equipment capital costs, this is a significant expense. Further, at this scale build windows are known to cloud with time due to the interaction of the UV blocker with the transparent surface chemistry. As such, this would be an expensive disposable component. Another potential issue with scaling this technology is the amount of resin that is required. The retail price of resin is between $120 and $250 per liter. For every 2.54 cm (1 inch) of depth, a five meter square build volume would require 127 liters to fill the tank. Assuming the underlying materials are on the order of $20-$40/L, this would cost $5,000 to charge, plus replacing whatever resin is required to produce the parts to keep the level at steady state.

Still another issue with SLA production at larger scales is that the photochemical reaction and subsequent polymerization is exothermic, which produces excess heat as a reaction by-product. Further, subsequent curing of finished parts are known to shrink by 40% for free radical initiated chemistries, but only about 4% for cationic chemistries.

Given the known limitations and deficiencies in the prior art, an unfilled need exists for larger area additive manufacturing that produces high quality surfaces that do not require extensive post processing, that can be manufactured at reasonable speeds, and that can be commercialized in an otherwise cost-effective way.

The technique and approach of this disclosure addresses this long-felt need.

BRIEF SUMMARY

SLA-based additive manufacturing using radiation-curable foams enables the production by 3D printing of light-weight parts having desirable physical and functional attributes. A representative method of manufacturing such items includes processing a radiation-curable resin in liquid form to produce a stable, non-aqueous radiation-curable foam, on-demand deposition of the foam at a build layer of a build surface within a 3D printer, and then solidifying the non-aqueous radiation-curable foam to produce a layer of a 3D build item. Processing the resin typically includes agitation, mixing, shaking, gas injection, ultrasonic stimulation, or combinations thereof. 3D articles of manufacture made by the above-described manufacturing process are also described.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

and

Figure 7:
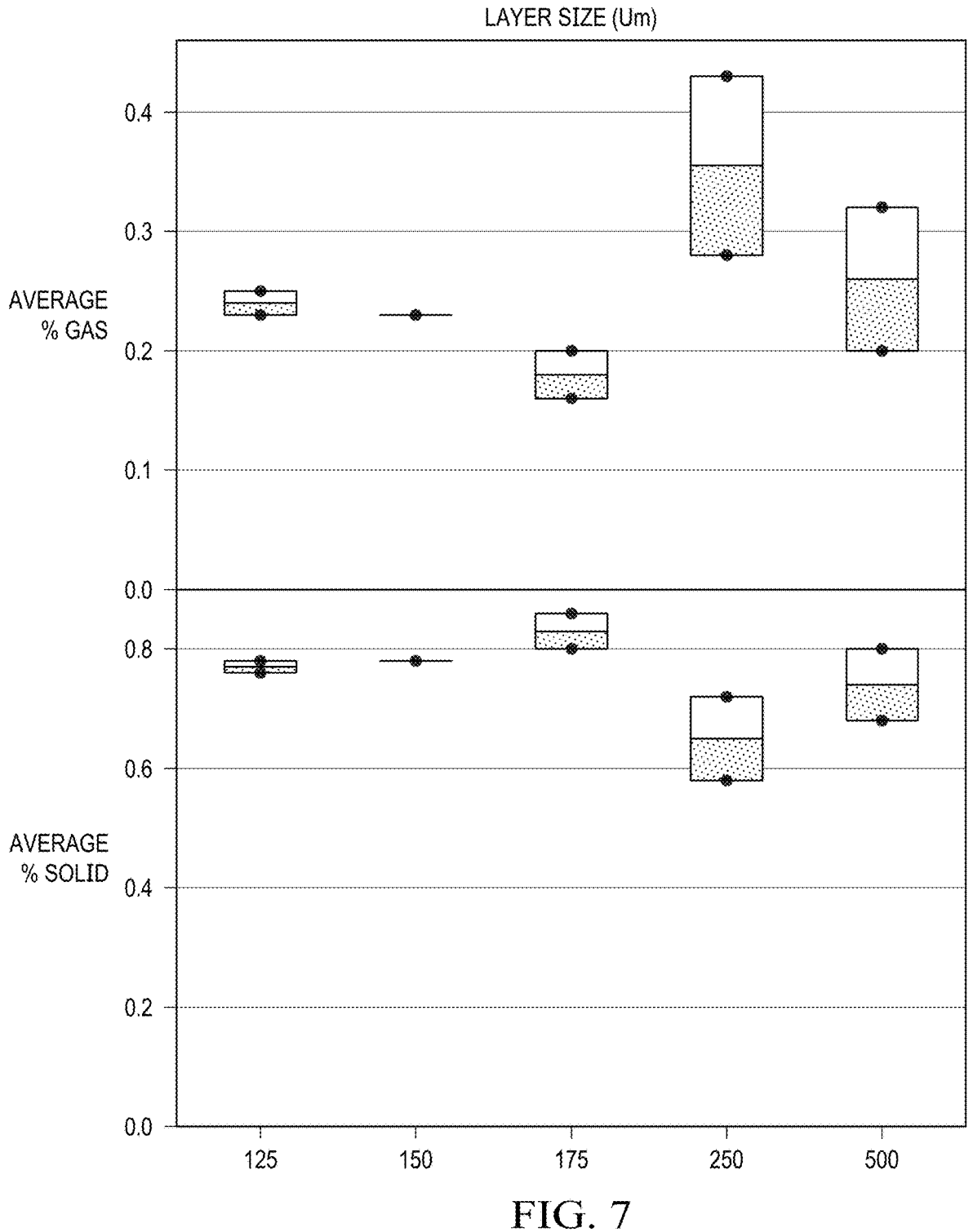

FIG. 7 depicts a chart that, for each of a set of layer sizes tested, compares relative percentages of gas and solid volume fractions in the resulting samples.

DETAILED DESCRIPTION

As previously described, stereolithography is a known technique for making solid objects by successively "printing" thin layers of a curable material, e.g., a radiation-curable material, one on top of the other. To this end, a programmed movable spot beam of light (e.g., UV) shining on a surface or layer of radiation-curable liquid is used to form a solid cross-section of the object at the surface of the liquid. As U.S. Pat. No. 4,575,330 teaches, the object is then moved, in a programmed manner, away from the liquid surface by the thickness of one layer and the next cross-section is then formed and adhered to the immediately preceding layer defining the object. This process is continued until the entire object is formed. Using this printing approach, many different types of object forms can be created using the computer to help generate the programmed commands and to then send the program signals to the stereolithographic object forming subsystem.

Figure 1:
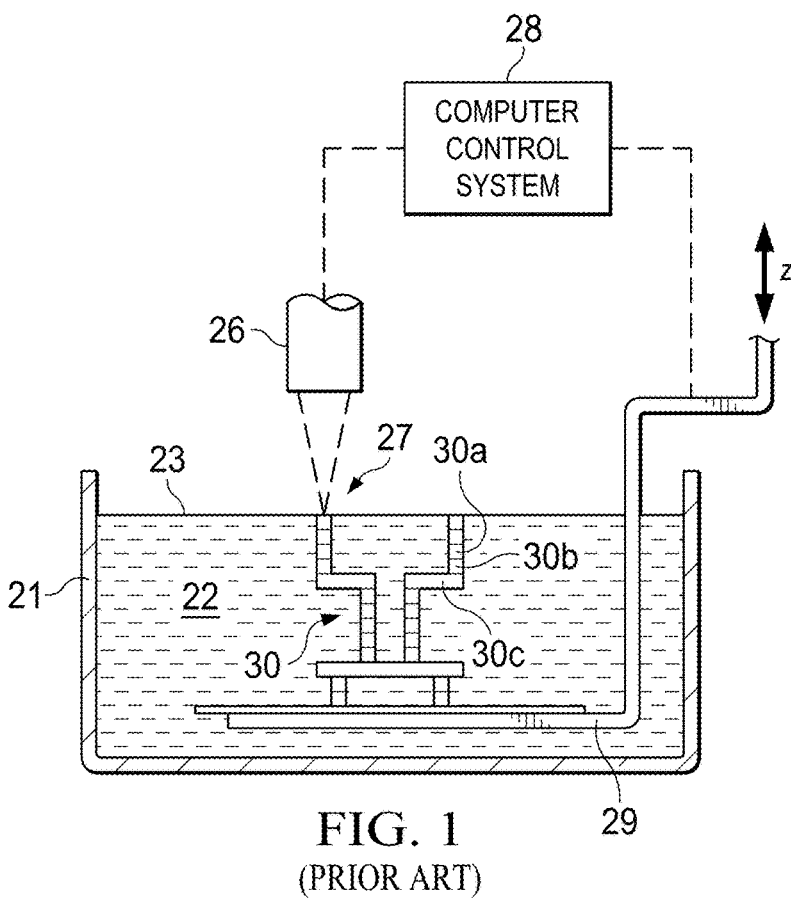
FIG. 1 is a known prior art "top-down" 3D printer implementation environment in which the techniques of this disclosure may be practiced.

FIG. 1 depicts a known prior art "top-down" approach to printing. This figure is reproduced from U.S. Pat. No. 4,575,330. Here, a container 21 is filled with a UV curable liquid 22 or the like, to provide a designated working surface 23. A programmable source of ultraviolet (UV) light 26 or the like produces a spot of ultraviolet light 27 in the plane of surface 23. The spot 27 is movable across the surface 23 by the motion of mirrors or other optical or mechanical elements that are a part of light source 26. The position of the spot 27 on surface 23 is controlled by a computer 28. A movable elevator platform 29 inside container 21 is moved up and down selectively, the position of the platform being controlled by the computer 28. The elevator platform may be driven mechanically, pneumatically, hydraulically or electrically, and it typically uses optical or electronic feedback to precisely control its position. As the device operates, it produces a three-dimensional object 30 by step-wise buildup of integrated laminae such as 30*a*, 30*b*, 30*c*. During this operation, the surface of the UV curable liquid 22 is maintained at a constant level in the container 21, and the spot of UV light 27 is moved across the working surface 23 in a programmed manner. As the liquid 22 cures and solid material forms, the elevator platform 29 that was initially just below surface 23 is moved down from the surface in a programmed manner by any suitable actuator. In this way, the solid material that was initially formed is taken below surface 23 and new liquid 22 flows across the surface 23. A portion of this new liquid is, in turn, converted to solid material by the programmed UV light spot 27, and the new material adhesively connects to the material below it. This process is continued until the entire three-dimensional object 30 is formed.

A computer controlled pump (not shown) may be used to maintain a constant level of the liquid 22 at the working surface 23. Appropriate level detection system and feedback networks can be used to drive a fluid pump or a liquid displacement device to offset changes in fluid volume and maintain constant fluid level at the surface 23. Alternatively, the source 26 can be moved relative to the sensed level 23 and automatically maintain sharp focus at the working surface 23. All of these alternatives can be readily achieved by conventional software operating in conjunction with the computer control system 28.

Figure 2:
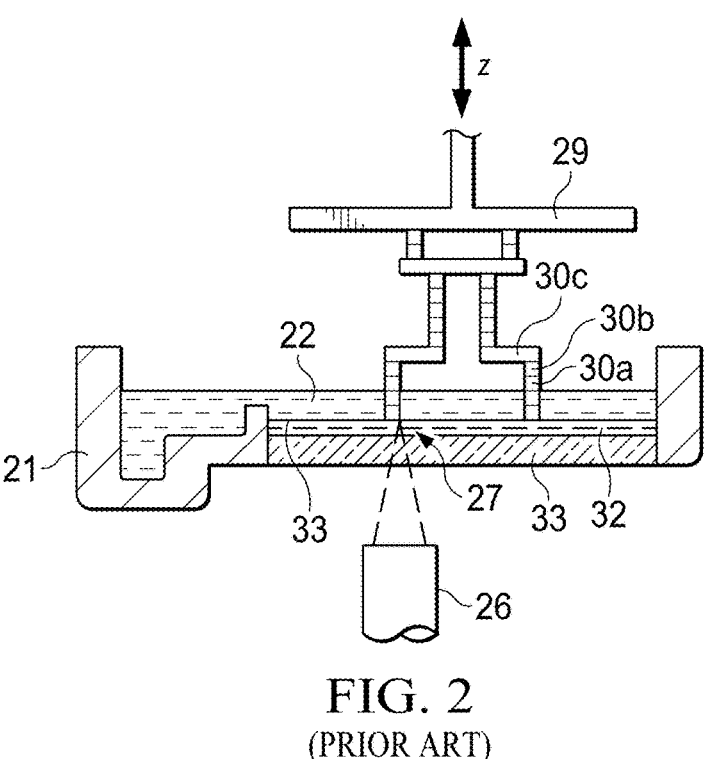
FIG. 2 is a known prior art "bottom-up" implementation environment in which the techniques of this disclosure may be practiced.

An alternative approach is to build the item from the "bottom-up" as depicted in FIG. 2, which is also reproduced from U.S. Pat. No. 4,575,330. In this approach, the UV curable liquid 22 floats on a heavier UV transparent liquid 32 that is non-miscible and non-wetting with the curable liquid 22. By way of example, ethylene glycol or heavy water are suitable for the intermediate liquid layer 32. In the system of FIG. 2, the three-dimensional object 30 is pulled up from the liquid 22, rather than down and further into the liquid medium, as shown in the system of FIG. 1. In particular, the UV light source 26 in FIG. 2 focuses the spot 27 at the interface between the liquid 22 and the non-miscible intermediate liquid layer 32, the UV radiation passing through a suitable UV transparent window 33, of quartz or the like, supported at the bottom of the container 21.

According to the techniques of this disclosure, and in lieu of printing just from resin in its liquid phase, one or more layers of the item are printed from resin that is foamed (at the build surface 23). In general, printing "foam" is highly desirable because, as compared to liquid, foam occupies a same volume (e.g., the tank) with significantly less material (by mass) than the same amount of resin in liquid form. Thus, because at least in part foamed resin is used to facilitate 3D manufacture of an item, significant manufacturing costs and efficiencies are obtained as less material is required to produce the item. Experimental data establishing this principle is set forth below.

Figure 3:
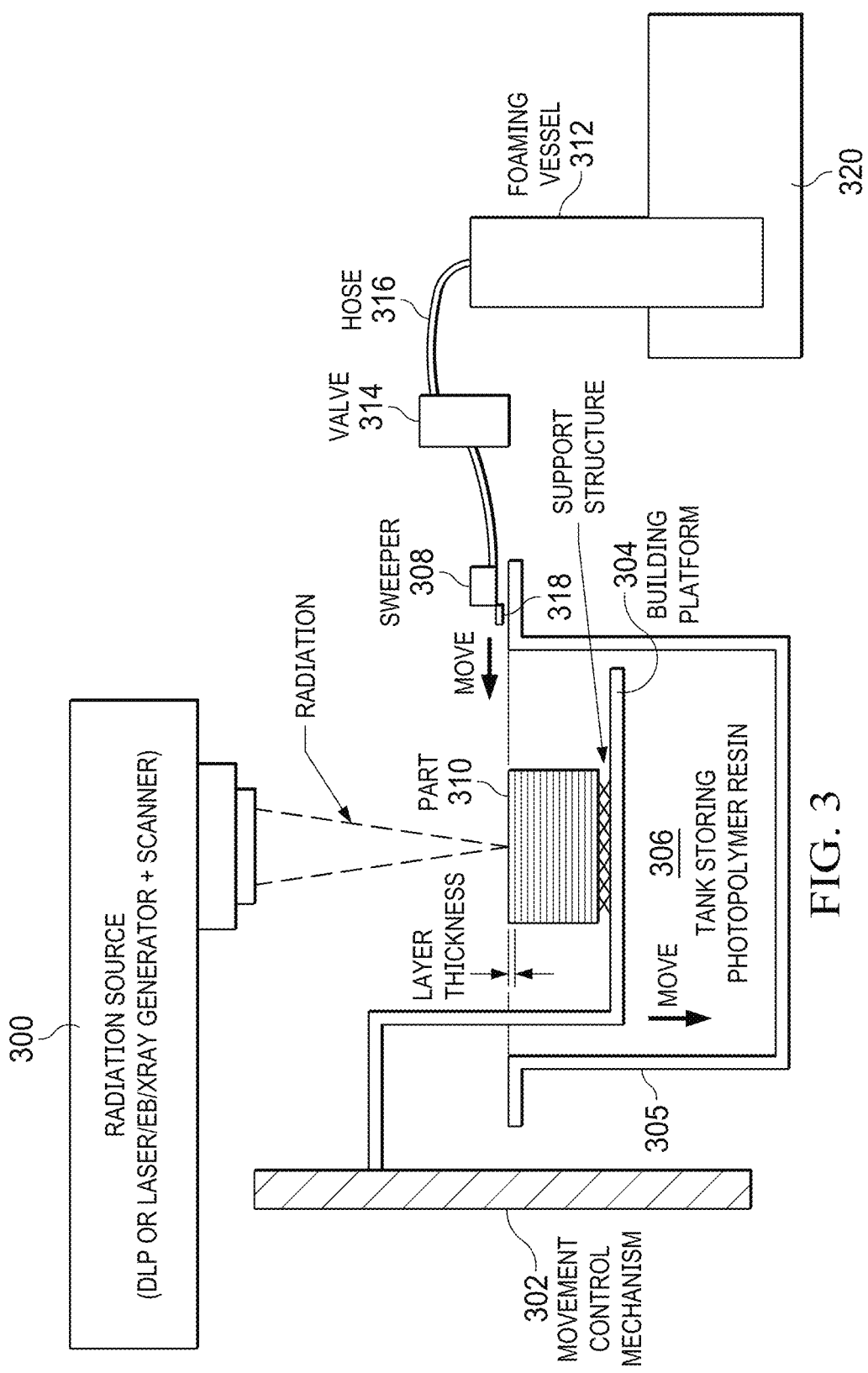
FIG. 3 depicts how the techniques of this disclosure may be implemented by retrofitting an existing printer to accommodate foam-based printing according to this disclosure.

With the above as background, FIG. 3 depicts a representative implementation of an additive manufacturing method and apparatus of this disclosure wherein resin foam is the source material for the printer. A top-down printing method is depicted although the techniques herein (of printing at a foam layer) may be implemented in a bottom-up manner as well. In this example embodiment, the SLA apparatus comprises a radiation source 300 (e.g., DLP, laser, electron beam (EB), x-ray, etc. and scanner), a movement control mechanism 302 (e.g., a stepper motor) that moves a build platform 304 vertically up and down within a tank 305 that holds the photopolymer resin 306, and a sweeper 308 (also known as a "recoater" blade) that sweeps horizontally. These elements are used to print a part 310 in the manner previously described.

According to this disclosure, the SLA apparatus is augmented with a foam producing and dispensing mechanism to facilitate production of resin foam at the printer interface, namely, the layer being printed. To this end, the mechanism comprises a foaming or pressure vessel 312, an electromechanical valve 314, and a hose or tube 316. A manifold 318 is attached to the sweeper 308 to evenly distribute the foamed resin across the top layer of the build surface. In particular, and as depicted, the foaming vessel receives liquid resin and a suitable gas (e.g., $CO_2$, $N_2O$, etc.). Gas is dissolved in the liquid resin within the foaming vessel (e.g., by shaking, missing, agitation, etc.) and selectively delivered to the build plate/platform via the hose 316 when the valve 314 is actuated, e.g., by a solenoid or other electromechanical, pneumatic, optical or electronic control device. Typically, the mechanism is under program control using a computer, which may be the same computer used to control the printer. In this embodiment, the mechanism includes a frother 320 (e.g., a mechanical agitator, an ultrasonic device, etc.) to shake or otherwise dissolve the gas within the liquid vessel if needed to produce foam.

Upon delivery of the resin and gas mixture (directly onto the build plate via the manifold 318), the gas spontaneously evolves out of the liquid mixture (due to the lower pressure) to produce a foam that is radiation-curable. The sweeper 308 spreads the foam evenly onto the plate, and the light engine is then activated to display the appropriate image to cure (solidify) the foam into a layer. Once the layer is formed, the movement control mechanism moves the platform down so that the next layer of the item can be built; the process is then repeated, once again preferably using the foam layer at the print interface.

Preferably, the foam dispensing is carried out in an automated manner and "on-demand" (meaning the foam is produced "just-in-time" to facilitate the printing of the current layer while the foam remains stable), once again under program control, so that the layer(s) are built up in a continuous manner.

Conventionally, 3D printing comprises a start-up procedure by which the 3D printer is prepared and internal states are set. Layer preparation and exposure is then initiated (under software program control), preferably using a deep dip (to recoat a top layer with excess resin), followed by conventional operations, namely: raise, recoat, range find, fine adjustment, exposure, and then repeat, followed eventually by shutdown. According to the approach herein, the above-described layer preparation and exposure operations are modified and preferably occur as follows: dip, raise, "minor" dip, dispense foam, recoat, range find, fine adjustment, exposure, and then repeat. The minor dip in particular is used to drop the surface of a last layer down so that a new layer can be made on top of it (and not necessarily to add additional resin to the build surface). The dispense foam operation is described above, and it adds new material to the top of the build surface for the new layer. Preferably, the above-described operations are carried out under program control, namely, computer program instructions executed by a hardware processor, by firmware, by programmable logic control (PLC), or the like.

In the example embodiment depicted above, the SLA apparatus may be a conventional SLA machine that is retrofitted (e.g., at its location of use) to include the associated mechanism 305. In this example, the liquid resin supplied to the pressure vessel is the conventional resin that otherwise is held within the tank. In an alternative embodiment, and presuming sufficient stability of the foam, the tank 304 may include just bulk foam in lieu of any liquid resin, or the tank may be partially filled with bulk foam (atop the liquid resin). Another alternative is saturate the liquid in the tank with a gas and then agitate the saturated resin (e.g., using ultrasound, mechanical agitation, etc.) to force the foam bubbles to rise to the surface layer being printed. This operation may be carried out continuously, or just before a particular layer is printed. As the tank level falls, additional liquid resin is added for replenishment or a suitable ballast is used to adjust the level of the tank.

In an alternative to the "retrofit" embodiment, the SLA apparatus includes the foaming mechanism as original equipment, namely, as an integral component or element.

In the embodiment described above, typically the resin applied to the pressure vessel is liquid photopolymer, such as CPS-1035F, a proprietary resin formulation from Colorado Photopolymer Solutions (CPS). Alternative resins include, without limitation, CPS SM1035 (a thiol-based resin), SM442 (a durable PDMS-like resin), and SM472 (an ABS-like resin).

As used herein, and as depicted in FIG. 3, the foam delivered to the build plate is sometimes referred to as "radcure" foam, meaning that the material is radiation-curable, and wherein the type of radiation may vary, e.g., ultraviolet (UV), visible, electron beam, and x-ray. The term "resin" refers to a photosensitized mixture of monomers, oligomers, and polymers that is cured by radiation. 3D printing refers to a form of additive manufacturing where components are made by the layer-wise addition of cross-sectional areas. SLA, as noted above, refers to the known technique of stereolithography, which is a form of 3D printing where—according to this disclosure—radcure resins are exposed to radiation to convert a liquid polymer to a solid polymer. Laser-based SLA uses point-to-point solidification procedure, whereas DLP-based SLA uses digital light processing to project an entire cross sectional area to form layer-wise addition. Either approach may be used herein. Subsequent layers are built up to form a product.

According to another aspect of this disclosure, the foam provided to the build plate may comprise the radiation-curable resin, and other materials. Thus, for example, the build technique herein may use a stable foam comprising a suitable surfactant, particle stabilizer or emulsifier, and the radiation-curable resin. Upon frothing, e.g., through mechanical mixing, shaking, gas injection, ultrasonic stimulation, or otherwise, a stable foam is produced. The foam is deemed stable, for example, when self-destructive processes due to liquid drainage, ripening and coalescence are controlled. Stable foams for radiation-curable resins are well-known in the prior art. When the foam is exposed to suitable radiation (e.g., during the build process) to initiate a polymerization reaction, it solidifies into cured resin as has been described. Advantageously, the cured resin has a higher fraction of gas, and thus it is lighter in weight than a cured non-foamed resin. As a result, parts formed at least in part using the cured foam-based resin are lighter in weight as compared to those produced using liquid resin. Further, by using radcure foam, parts are produced more cheaply because less material is required for fabrication (due to the volume fraction occupied by the gas phase of the foam). Producing structures at least in part out of radcure foam alleviates additional shortcomings in the current state-of-the-art for 3D printing, such as curling and shrinking of solid objects, and in particular by incorporating internal isotropic structures. To optimize designs, comprehensive iterative computational design may also be leveraged.

In an embodiment, a radiation curable (radcure) foam concentrate C is formed by mixing a radiation curable resin A, and a foaming agent B. A representative but non-limiting radiation curable resin A is PR48 from Autodesk Ember, which is a clear resin that consists of a monomer or an oligomer (e.g., Allnex Ebecryl 8219 39.776% and Sartomer SR494 39,776%), a reactive diluent (Rahn Genomer 1122, 19.888%), a photoinitiator (Esstech TPO+ (2,4,6-Trimethylbenzoyl-diphenylphosphineoxide) 0.400%), and a UV blocker (Mayzo OB+ (2,5-thiophenediyl)bis(5-6tertbutyl-benzoxazole)) 0.160%. As is well known, resin cures by radiation-initiated free radical or cationic polymerization mechanisms. A representative but non-limiting foaming agent is an emulsifier, surfactant, particle solid that promotes the formation and stabilization of aqueous, non-aqueous or an emulsion-based foam. Examples include, without limitation, diglycerol α-monomyristate ($C_{14}G_2$), diglycerol α-monolaurate ($C_{12}G_2$), glycerol α-monolaurate ($C_{12}G_1$), and the like. The foam C preferably is a mixture of radcure resin A and the suitable foaming agent B (surfactant, emulsifier, particle-stabilized, or the like), which is used to enhance and stabilize the foam. Typically, C is in concentrated form before being agitated.

In an alternative embodiment, the concentrate (such as described above) is subject to frothing (e.g., agitation, mixing, shaking, gas injection, ultrasonic stimulation, combinations thereof, or the like) to produce a foam radcure resin C* in which the radcure resin and foaming agent mixture expands in volume and produces a stable non-aqueous radiation-curable foam. The foam C* may be wet or dry, with the wet foam characterized by spherical bubbles, and the dry foam characterized by polyhedra.

The following describes one embodiment for making the foam C*. In this embodiment, the foam concentrate is made by mixing a radcure resin A (90-99.5% by weight) with a foaming agent (0.5-10% by weight), wherein the foaming agent is an emulsifier, surfactant or solid particles. In this embodiment, enhanced frothing and stabilized froth prior to and during radiation curing is achieved by exemplary surfactants such as, without limitation, alkylaryl polyether alcohols, dioctyl sodium sulfosuccinate, silicone fluids, and the like, as well as surfactants and emulsifiers such as monoglycerols, polyglycerols, and the like, as well as solid particles.

The concentrations of A+B to make C may vary, for example, 5-80 parts by weight of the oligomer, preferably 15-40 parts of the reactive diluent, 0.05-10 parts (preferably 0.01-0.5 parts) photosensitizer; 5-30 parts (preferably 15-25 parts) plasticizer, and 0.5-10 parts (preferably 3-5 parts) of the foaming agent.

As noted above, foam formation (of C into C*) preferably is achieved by means of gas injection, agitation, mixing, or the like. Simple shaking, mechanical mixing or frothing by a specialized frothing apparatus (e.g., available commercially by the Oakes Company of iSi North America) can be used to generate the foam. The chemical structure of the resin and foaming agent (e.g., polarity, functionality, molecular weight, viscosity, etc.) and foam formation mechanism (e.g., gas injection, agitation, etc.) determine the foam characteristics and structure, and they can be tuned to generate a foam with the characteristics of interest (namely, uniform foam bubbles approximately 20 microns in size). Preferably, chemical liberation of gas is not advised, and care should be taken to avoid mixing oxygen with the resin foam, as oxygen is a known reaction inhibitor for free-radical initiated reactions.

The following describes the structural attributes of C and C*. Uncured foams have a closed cellular structure. Stable foams are not self-destructive, e.g., due to liquid drainage, ripening, coalescence, or otherwise. They may be stable for long periods of time. Foams may be wet and characterized by regular spherical bubbles, or dry characterized by polyhedral. With respect to their functional attributes, stable foams expand to occupy multiple times the volume of unfoamed liquid. During the SLA build process, and according to this disclosure, these lightweight, ordered cellular structures (foam bubbles or polyhedral) solidify using radiation to produce lightweight parts from a relatively small volume of liquid (that comprises the foam). Stable foams of this type cure faster than non-foamed liquid resins, and they should reduce shrinkage and curling associated with traditional radiation-curable 3D printed part production.

The foam C* is useful to produce any number and type of 3D parts (structures 110 or 210 in FIG. 1 and FIG. 2) during the SLA additive manufacturing process by layer-wise additional of cross-sectional areas using known 3D printer technologies, products and systems. The approach may be carried out either in a top-down manner, or a bottom-up manner, or using other techniques such as continuous extrusion. A 3D part manufactured in this manner may be identified by the uniform or non-uniform (in cross-section) microscopic foam structure, its high degree of polymer cross-linking, and segmentation, layers or seams associated with layer-wise additive manufacturing. As noted above, the structural properties of the part are dependent on the materials used (e.g., flexible versus rigid resin), as well as on the underlying structure of the material.

As an alternative, and prior to printing, C (the radcure foam concentrate) may be modified with additional components D, such as fibrous reinforcement materials (e.g., carbon fiber, fiberglass, and other organic and non-organic materials. D may range in size from several microns or smaller (e.g., carbon nanotubes), to 10-100 centimeters or more. When C and D are combined, the result is a fiber-reinforced radcure resin. When C is agitated to C* using the methods described above, and when C contains D, the result is a fiber-reinforced foamed composite resin. Radiation-cured fiber-reinforced composite materials may require additional curing energy during manufacture because the black carbon fibers absorb UV and visible radiation. Higher energy radiation (e.g., electron beam, x-ray curing, etc.) may be used to facilitate printing in these circumstances.

The techniques herein (using C or C*) enable large format production of parts, at least in part because less material is required for fabrication due to the high volume fraction occupied by the gas phase. Producing structures out of radcure foam as described herein alleviates other shortcomings of traditional 3D printing, such as part curling and shrinking. The approach herein facilitates manufacture of lighter weight parts and thus lighter-weight vehicles and the like (that include them), thereby resulting in lower emissions, lower operating expenses, and the like. In-situ fabrication of parts using the radcure foam reduces manufacturing costs and provides improved thermoset parts and composites that do not rust or corrode.

A representative 3D printer that may be used for additive manufacturing according to this disclosure is the Octave Light R1 70 μm printer, available from Octave Light. This is a top-down device that has a build volume of 204 mm (height) by 134.4 mm (width) by 75.6 mm (length), and a horizontal XY plane resolution of 70 μm by 70 μm per pixel, and a vertical Z direction resolution of 5 μm. Typically, the build layer capability is 25 μm by 125 μm. The light source is a 405 nm wavelength UV LED, which is driven by a high precision UV DLP optical system with 1920×1080 square pixels. The optical engine includes a light sensor to accurately adjust the intensity of the UV LED. The printer includes a laser measurement sensor with 3 μm resolution that is able to measure the surface location of the material. As noted, the build system is top-down with a recoater blade.

Experimental Data

As described above, one preferred printing technique involves "on-demand" generation of the foam layer (at the print interface). To establish that items could be 3D printed using foam resin and in this on-demand manner, an experiment was performed to compare parts made, on the one hand, from foamed radiation curable resin, and, on the other hand, those may from conventional (i.e., unfoamed) liquid resin. This experiment was carried out using an Octave Light R1 70 μm printer, available from Octave Light. This is a top-down device that has a build volume of 204 mm (height) by 134.4 mm (width) by 75.6 mm (length), and a horizontal XY plane resolution of 70 μm by 70 μm per pixel, and a vertical Z direction resolution of 5 μm. Typically, the build layer capability is 25 μm by 125 μm. The light source is a 405 nm wavelength UV LED, which is driven by a high precision UV DLP optical system with 1920×1080 square pixels. The optical engine includes a light sensor to accurately adjust the intensity of the UV LED. The printer includes a laser measurement sensor with 3 μm resolution that is able to measure the surface location of the material. The build system is top-down with a recoater blade.

The experiment involved creating six (6) cylinders, each measuring 2 mm high and 20 mm in diameter. A commercially-available resin, CPS-1035F, from Colorado Photopolymer Solutions, was utilized. After the build was completed, the samples were cleaned in an isopropyl alcohol bath for 30 minutes and then post-cured under a 30 Watt UV LED flood lamp for 60 minutes. The samples were then weighed on an electronic scale, and the weights were recorded with three significant figures. Samples were then cut, and cross-sectional images were obtained with a Smart-Zoom 5 optical microscope, available from Zeiss.

The experiment was performed for the following layer thicknesses (in μm): 500, 250, 175, 150 and 125. A single control experiment was performed using the standard printer settings and protocol for this resin for each of the layer thicknesses. Next, two (2) trials were performed using foamed resin for each layer thickness. In particular, the foam was generated using the 1035F resin and $N_2O$ gas using as an 0.5 liter whip creamer (from iSi North America). The resin was added to the whip creamer and the lid attached. Next, a gas charge was added to the whip creamer and the mixture was shaken thoroughly for sixty (60) seconds. The printer settings were then modified to reduce the dip depth to 10 μm ("minor dip") to eliminate the plate dipping into the resin vat, and to reduce the speed of the recoater blade. The foam was dispensed directly onto the build surface using the whip creamer, using a 3 mm decorating tip nozzle. The recoater blade then spread the foam evenly onto the build surface and the light engine then displayed the appropriate image to solidify the foam.

The results of the experiment showed that the control samples were clear and the foamed samples were translucent. Under the microscope, bubbles were clearly seen in the cross-sections of the foam samples. These bubbles formed lenticular structures that scattered the light, hence the translucent appearance. The mass of the samples also confirmed that foam was successfully printed. All foamed samples showed a reduction in mass. The 125 um and 150 um layer size experiments show excellent uniformity across all 12 samples, and a weight reduction of 20-25% compared to the control samples.

Figure 4:
FIG. 4 depicts a cross-section of a control sample printed in a conventional manner using a liquid resin.
Figure 5:
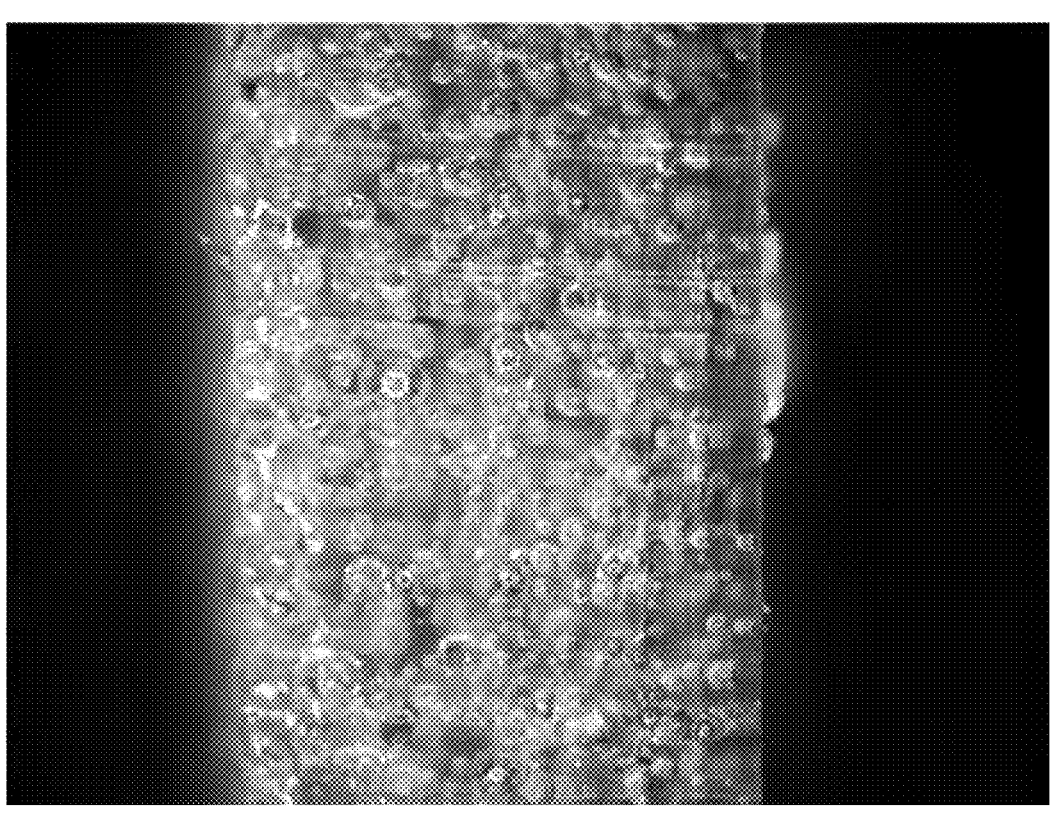
FIG. 5 depicts a cross-section of a sample (shown under ring light) printed using foam according to the technique of this disclosure.
Figure 6:
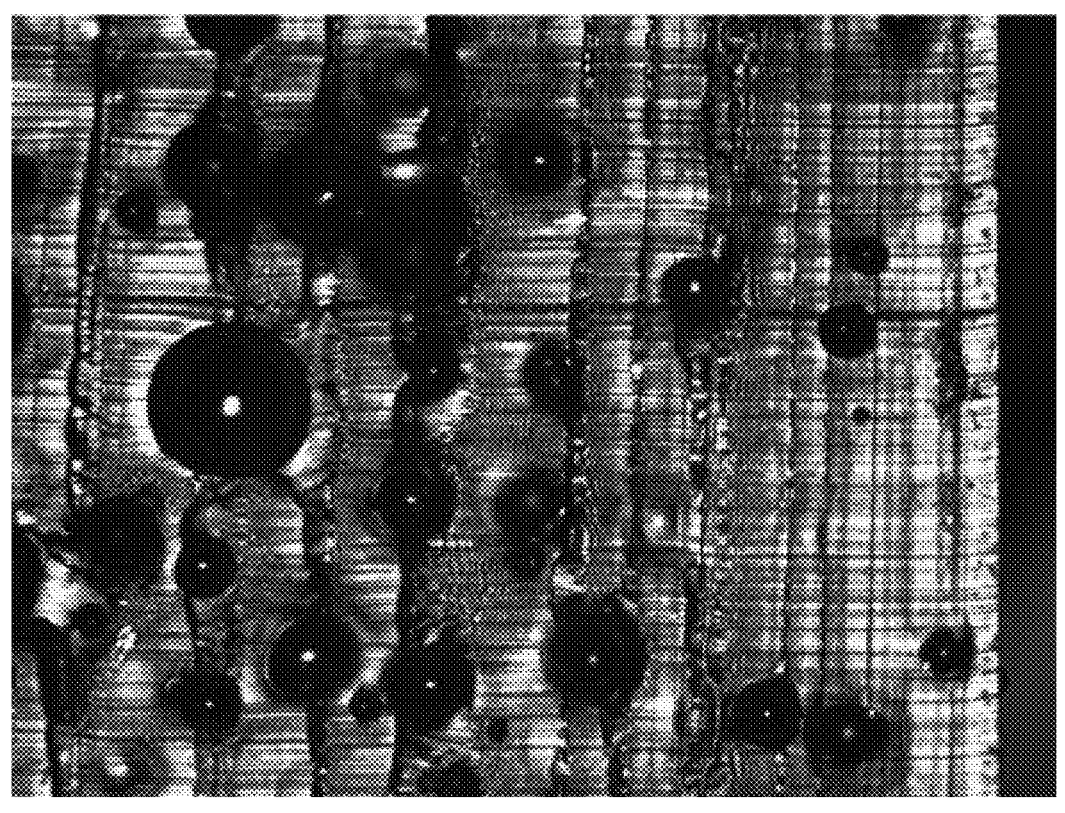
FIG. 6 depicts a cross-section of the foam-printed sample (shown under confocal light)

FIG. 4 depicts a cross-section of a control sample printed in the conventional manner using a liquid resin. FIG. 5 depicts a cross-section of a sample (shown under normal light) printed using foam. FIG. 6 depicts a cross-section of the same foam-printed sample, but shown under confocal light. FIG. 7 depicts a chart that, for each of the layer sizes tested, compares relative percentages of gas and solid volume fractions in the resulting samples.

While the above describes a particular order of operations performed by certain embodiments of the described subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular 3D printing machine or system that is specially constructed for the required purposes, or an existing commercial 3D printer that has been adapted to print using the above-described foam and foam dispensing mechanism.

While the preferred technique as described above uses layer-wise additive manufacturing, other manufacturing processes may be used to process the foam to produce the build item. Thus, for example, in an alternative embodiment, the radiation-curable foam is placed in a mold and exposed to an electron beam or x-ray, and the foam is then cured in the mold. Still another alternative is to use laser holography, wherein two lasers intersect in a tank of foamed resin and cure the resin at that spot.

What is claimed is as follows:

1. A method of additive manufacturing in which a three-dimensional (3D) object is built in a layer-by-layer fashion upon a build platform, comprising:

receiving, at a build layer, a photo-curable foam, the photo-curable foam having been produced by mixing a particle solid into a photo-curable liquid resin;

depositing the photo-curable foam at the build layer to create a layer of the 3D object, the layer having a thickness up to 500 μm, the thickness being a maximum cure depth; and with the particle solid present in the deposited photo-curable foam, irradiating the deposited photo-curable foam to create the layer.

2. The method as described in claim 1 further including producing the photo-curable foam.

3. The method as described in claim 2 wherein the photo-curable foam is produced on-demand or in advance of the additive manufacturing.

4. The method as described in claim 2 wherein, during production of the photo-curable foam, the particle solid acts as a foaming agent that promotes formation and stabilization of spherical bubbles in the photo-curable foam.

5. The method as described in claim 1 wherein the build platform has a build tray that reciprocates vertically within a tank of photo-curable liquid resin, the method further including:

in lieu of dipping the build tray into the tank, dropping the build platform by just one layer so as to selectively position a last built layer of the 3D build item just below a next build layer; and with the build platform so positioned, delivering the photo-curable foam at the next build layer; and wherein the irradiating occurs at the next build layer.

6. The method as described in claim 1 wherein the photo-curable foam is 90-99% by weight of a radiation-cured resin, and 0.5-10% by weight particle solid.

7. A method of improving an additive manufacturing process in which a three-dimensional (3D) object is built at least in part by curing a non-foamed photo-curable liquid resin, the improvement comprising:

receiving, at a build layer of a build platform, a photo-curable foam, the photo-curable foam having been produced by mixing a particle solid into a photo-curable liquid resin; and depositing the photo-curable foam at the build layer to create a layer of the 3D object, the layer having a thickness up to 500 μm, the thickness being a maximum cure depth; and with the particle solid present in the deposited photo-curable foam, irradiating the deposited photo-curable foam to create the layer;

wherein inclusion of the particle solid in the photo-curable foam increases a cure rate of the deposited photo-curable foam as compared to the cure rate of the non-foamed photo-curable liquid resin.

\* \* \* \* \*